United States Patent [19]

Bartlett

[11] 4,365,383

[45] Dec. 28, 1982

[54] CLEANING APPARATUS FOR COMPONENTS

[75] Inventor: John M. Bartlett, Woodcote near Reading, England

[73] Assignee: Elan Pressure Clean Limited, Oxford, England

[21] Appl. No.: 234,715

[22] Filed: Feb. 17, 1981

Related U.S. Application Data

[63] Continuation-in-part of Ser. No. 51,500, Jun. 25, 1979, abandoned.

[51] Int. Cl.³ ............................................... A47L 5/38
[52] U.S. Cl. .................................... 15/302; 15/306 B; 15/312 R; 15/316 R; 134/72; 134/148; 134/172; 134/199
[58] Field of Search ................. 15/302, 306 B, 316 R, 15/312 R; 134/72, 82, 131, 144, 148, 153, 161, 165, 172, 180, 181, 199, 178

[56] References Cited

U.S. PATENT DOCUMENTS

| | | | |
|---|---|---|---|
| 2,171,561 | 9/1939 | Hooven | 116/202 |
| 2,286,014 | 6/1942 | Rowe | 116/202 |
| 2,393,215 | 1/1946 | Arey et al. | 134/82 |
| 2,595,838 | 5/1952 | Fuglie | 134/111 |
| 2,604,896 | 7/1952 | Cozzoli | 134/1786X |
| 2,661,310 | 12/1953 | Page et al. | 134/32 |
| 2,972,995 | 2/1961 | Umbricht et al. | 134/153 |
| 2,979,062 | 4/1961 | Umbricht et al. | 134/153 |
| 3,060,064 | 10/1962 | Zingg | 134/33 |
| 3,153,419 | 10/1964 | Evans et al. | 134/66 |
| 3,451,094 | 6/1969 | Kywi | 15/302 |
| 3,656,493 | 4/1972 | Black et al. | 134/172 |
| 3,799,178 | 3/1974 | Anderson et al. | 134/153 |
| 3,837,037 | 9/1974 | Wright | 15/302 |
| 3,849,831 | 11/1974 | DeVerter et al. | 15/316 R |
| 4,027,686 | 6/1977 | Shortes et al. | 134/153 |

FOREIGN PATENT DOCUMENTS 110858  1/1964  Czechoslovakia ................. 134/113

Primary Examiner—Chris K. Moore
Attorney, Agent, or Firm—Schuyler, Banner, Birch, McKie & Beckett

[57] ABSTRACT

A cleaning apparatus for components has means for washing components with high pressure water at a pressure above 1000 psi and preferably about 3000 psi, and an airknife drying means for drying components with a high volume of air at low pressure. Valve means are provided in the high pressure water line so as to selectively control the application of the water.

The washing and drying means may be effected at different stations, transfer means being provided for transferring components between stages, or alternatively the washing and drying may be carried out at the same station. The dirty water from the washing is recycled for re-use.

14 Claims, 10 Drawing Figures

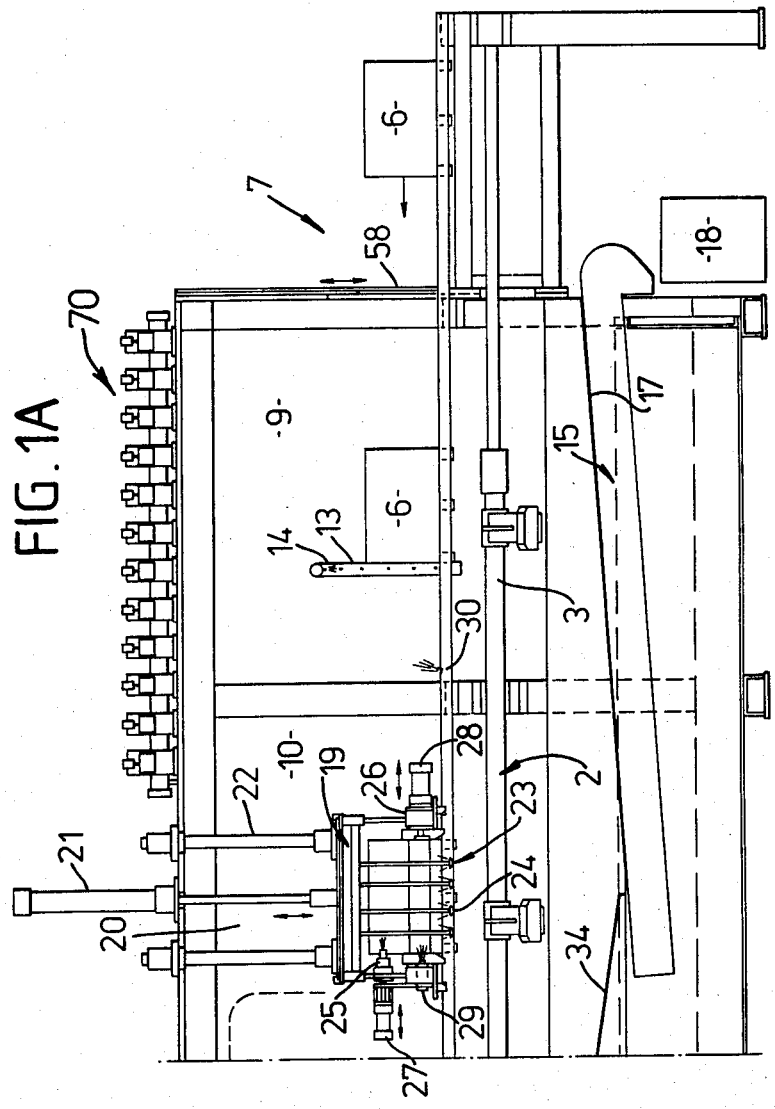

CLEANING APPARATUS FOR COMPONENTS

CROSS REFERENCE TO RELATED APPLICATION

This application is a continuation-in-part application of U.S. application Ser. No. 51,500 filed June 25, 1979 and now abandoned.

FIELD OF THE INVENTION

This invention relates to an improved cleaning apparatus for machine components and particularly, though not essentially, for components in the car industry.

BACKGROUND OF THE INVENTION

At present car components are washed at a first station with low pressure water at 80-120 psi and the washed components are then passed to a drying station where air is usually blown at the components. Each station has a wheel assembly around which a component passes so that a continuous cycle can be achieved whilst the components are retained at each station a sufficiently long time to complete the washing or drying step respectively. In order to supply the water manifold or manifolds of previous arrangements a very high powered pump was required in order to enable sufficient flow to be generated.

The present apparatus suffers from the disadvantages that (a) the washing and drying stages are slow requiring the wheel arrangements at each station and (b) that as low pressure water is used about 1000-1200 gallons per minute of dirty water is produced creating filtration problems. The main filtration at present is effected by blanket filters in which a vacuum draws off swarf etc. However very soon the filters become blocked and the washing water is recycled and re-used still dirty.

Examples of conventional engine block cleaning apparatus are U.S. Pat. Nos. 2,979,062, 3,153,419 and 2,972,995. U.S. Pat. No. 2,979,062 discloses washing apparatus for engine blocks having a washing stage, a rinsing stage and a drying stage. Each stage includes a respective, vertically-disposed turret about which the block passes during movement from one end of the apparatus to the other. The components are washed with 'high pressure' water from fixed spray nozzles but the nature of the pump required suggests that 'high pressure' is not within the ranges specified in the present application. Moreover there is no control of the supply of water to the respective nozzles.

U.S. Pat. No. 3,153,419 discloses a similar arrangement but the turrets are arranged horizontally. The component is washed with water which is pumped from a reservoir by means of a pump capable of delivering 1500 gallons per minute at a pressure of 70 psi which is regarded in that specification as "high pressure washing".

U.S. Pat. No. 2,972,995 discloses apparatus for washing engine blocks in which the engine blocks are passed along a conveyor path and washed by a series of fixed jets with water under 'substantial' pressure.

The use of water at high pressure for cleaning has been proposed before but in these prior arrangements the requirements have not been the same. For example U.S. Pat. No. 4,027,687 discloses a method of cleaning the surface of silicon semiconductor material using water at 4000-6000 psi, and in U.K. specification 1,386,342 there is disclosed a system of washing aluminium foils with high pressure water up to a pressure of about 2844 psi; however in neither of these two arrangements is the quantity of water used going to be a serious consideration.

Similarly, U.S. Pat. No. 3,060,064 relates to the cleaning of tube bundles which includes a final step of jetting water at 1000 to 3000 psi, but there is no suggestion that the water is to be collected and reused and accordingly the quantity and control of the amount of water consumed is unlikely to be important.

In the present invention by controlling the application of the water via the washing jets the amount of water consumed is reduced to a minimum having the advantage that a smaller pump can be used and filtration for recycling of dirty water is simpler.

SUMMARY OF THE PRESENT INVENTION

According to the present invention there is provided a cleaning apparatus for components comprising a cleaning chamber, support means for supporting a component within the cleaning chamber during cleaning, means for washing the component with a low volume of water less than 200 gallons per minute at a high pressure above 1000 psi, said washing means comprising pump means, a water manifold for receiving water at high pressure from the pump means, a plurality of washing heads in fluid communication with said water manifold, and valve means associated with each of the washing heads and operable on actuation to open or close the supply of water to the respective washing heads whereby the application of the water via the washing heads can be controlled, and means for drying the components.

In one embodiment of the invention the washing and drying stages are effected at different stations, transfer means being provided for transferring components between the stages.

In another embodiment the apparatus includes means for receiving the component and for changing the position thereof so as to present the different sides of the component to the washing means, the washing means and component being movable relative to one another so as to effect a total cleaning of the component.

Preferably in this second arrangement the washing means is mounted on a carriage movable parallel to X and Y axes so that the washing means is movable relative to the component in a single plane. The means for receiving the component is preferably an indexable table. A rotatable table enables four faces of a component to be cleaned but, if it is required that the other two faces be cleaned, then it is necessary to have two mountings fitted to two opposite faces and with these two mountings positioned across the machine in the same plane as the XY axis, the indexing table can drop and the mountings be located on two trunnions allowing cleaning of the other two faces. Alternatively the trunnions can raise and the table drop to achieve the same effect.

Preferably all the washings are fed on to a magnetic conveyor which will remove all ferrous contaminates, further filtration being effected by high rate sand automatic filtration, cartridge filtration and high pressure line filtration.

In each embodiment a diverter valve means is provided between the pump means and the water manifold, the diverter valve means comprising a hollow body, an inlet to the body for water from the pump means, an outlet from the body to the storage reservoir, an outlet from the body to the water manifold, a ball valve member movable within the body between first and second seatings on the body whereby the inlet is always in fluid communication with one of said outlets, a fluid-operated actuator for moving the ball valve member between the first and second seatings, and a floating coupling between the ball valve member and the fluid-operated actuator so that the ball valve member may position itself accurately upon the first or the second seating.

The invention also includes a method of cleaning a component such as an engine block comprising the steps of introducing the component into a cleaning chamber, providing a high pressure washing means including, pump means, a water manifold for receiving high pressure water from the pump means, a main washing head and a selective washing head, and valve means associated with each washing head, moving the high pressure washing means and the component relative to one another so as to wash the component with a low volume of water less than 200 gallons per minute at a pressure above 1000 psi and below about 10,000 psi, moving the selective washing head relative to the main washing head and to the component to effect selective washing of particular parts of the component, selectively actuating the valve means so as to open or close the washing heads whereby the application of water via the washing heads may be controlled, and drying the components.

Preferably the air is supplied in high volume eg: about 1000 cubic feet per minute and at low pressure eg: about 2½ psi.

The pressure of the water at the washing station is preferably higher than 3000 psi and may be as high as 10,000 psi or more, preferably it is in the range 3000 to 7000 psi. The high pressure means the low volumes are used, i.e. the volume is preferably less than 200 gallons per minute, for example in the range of 10 to 40 gallons per minute, usually 15 to 25 gallons per minute per pump.

The dirty water is preferably recycled and when washing ferrous components it is preferred to incorporate a magnetic filter to remove swarf etc. from the dirty water. The dirty water when recycled preferably passes through at least two filtration stages before reuse thereby filtering down to 10 micron.

BRIEF DESCRIPTION OF THE DRAWINGS

The invention will now be described by way of example with reference to the accompanying diagrammatic drawings in which:

FIG. 1a is a diagrammatic side elevation of the left-hand end of one embodiment of cleaning apparatus particularly for cleaning engine blocks and FIG. 1b is a side elevation of the right-hand end of the cleaning apparatus of FIG. 1a;

DESCRIPTION OF THE PREFERRED EMBODIMENTS

Figure 2:
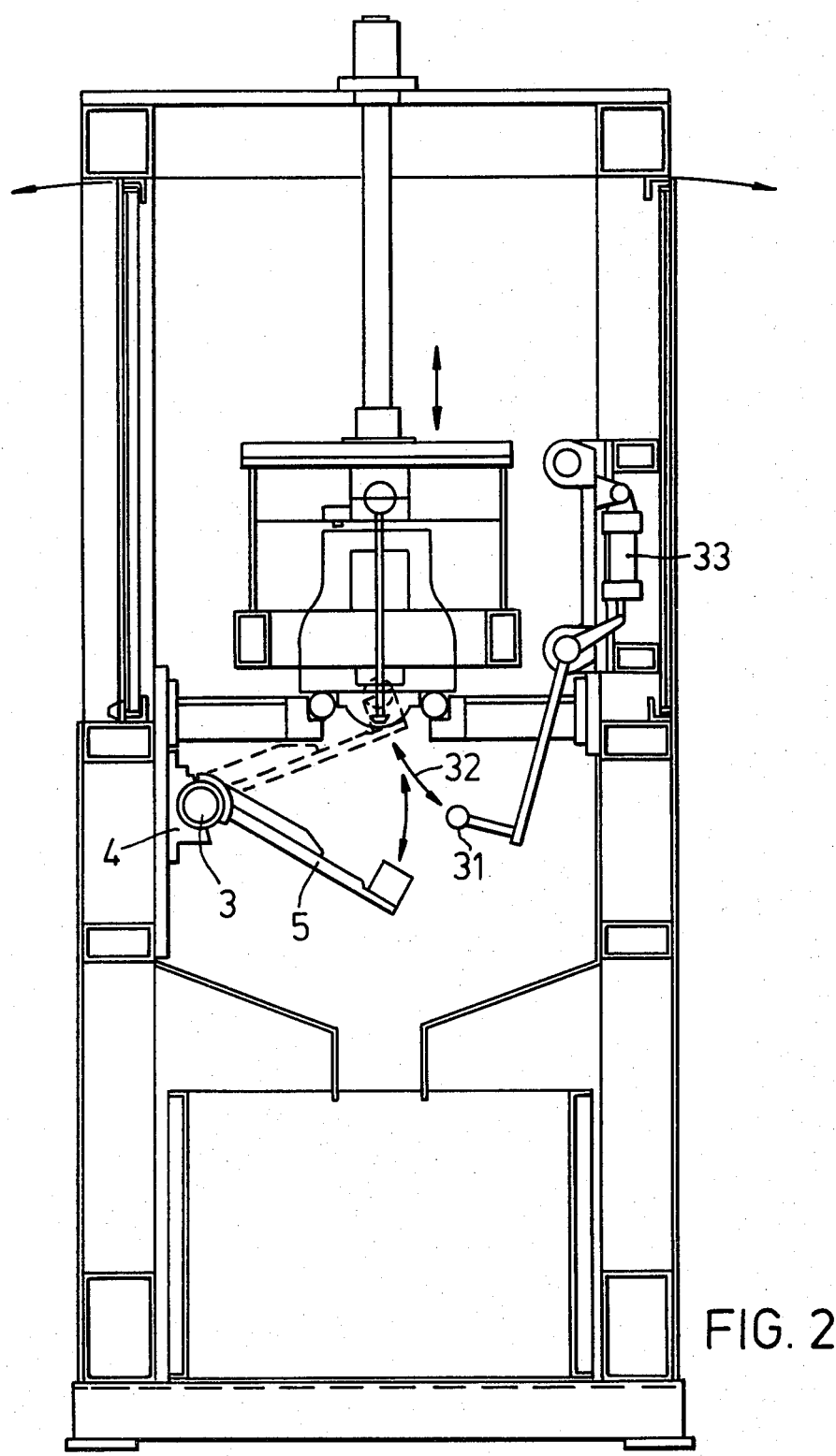
FIG. 2 is a section through the first washing station.

In the drawings a first embodiment of cleaning apparatus for machine components comprises a fixed base 1 in which a transfer mechanism 2 is mounted. The transfer mechanism comprises a reciprocal bar 3 which is also arranged to be angularly movable about its own axis. The bar 3 is supported in bearings 4 and includes a plurality of fixed arms 5 which are movable into and out of the component path as indicated by FIG. 2. On the forward stroke of the bar 3 the arms 5 are arranged to be in engagement with components on the path so as to move them one step forward and on the return stroke the arms 5 are moved out of the path. In this way a stepped advance of components is achieved.

The transfer mechanism 2 moves components, e.g. engine blocks 6, from a loading station 7, through four cleaning stations, to an unload station 8. The four cleaning stations in sequence are a pre-wash station 9, a first washing station 10, a second washing station 11 and a drying station 12.

The pre-wash station 9 comprises a washing arch 13 at which a component is washed by high pressure water issuing from a plurality of water jets one of which is indicated as 14. The water produced by the pre-washing falls onto a shute 15 which directs the water to a dirty water tank 16 and thence for recycling as described in more detail later. However, in order to remove iron swarf removed from the component by washing a belt of magnets 17 is caused to pass beneath the shute 15 drawing the swarf away from the tank 16 and into a collection container 18. In order to ensure that all the water produced at the pre-wash station passes down the magnetic shute 15 side plates (not shown) are provided to direct water towards the chute.

The first washing station 10 comprises a washing manifold 19 which is movable up and down in the direction of arrow 20 by means of a central hydraulic cylinder assembly 21 and as guided by guide bars 22. The washing manifold 19, in the illustrated embodiment, has four projecting jets 23, one for each cylinder of a four cylinder engine block. As illustrated in FIG. 1 the projecting jets 23 have dished bottoms 24 so as to provide an annular, upwardly-directed jet. The washing manifold 19 also includes end jets 25 and 26 which are movable, as indicated by the associated arrows, by means of respective hydraulic cylinder assemblies 27 and 28. In addition a third fixed end jet 29 is provided as indicated. It will also be seen from FIG. 1 that between the pre-wash station 9 and the first washing station there is a stationary high-pressure jet 30 washing the lower surface of the component as it passes between the two stations.

Referring now more particularly to FIG. 2 it will be seen that a further washing jet 31 is provided at the first washing station for washing the lower surface of the component. The washing jet 31 is pivotally mounted and is movable into its operative position, indicated by the arrow 32, by means of a hydraulic cylinder assembly 33. Dirty water from the first washing station mainly falls onto the magnetic chute 15 but some will fall onto ramp 34 which conducts the water to the shute 15 and then into the tank 16.

Having been selectively washed at the first washing station the component is moved to the second washing station 11. The second washing station includes a frame 35 having guide bars 36 for a movable retaining member 37. Retaining member 37 is movable by means of hydraulic cylinder assembly 38 as indicated by the associated arrow and engages over the uppermost surface of the component. Then, by means of hydraulic crank assembly 39 fixed to the main frame 1, the whole frame 35 and the support bars 40 on which the component is seated is rotated relative to fixed high-pressure water jets 41 as indicated by arrow 42. The support bars 40 are broken at 43 to enable this to be done. The high-pressure water jets 41 themselves are also movable by means of hydraulic cylinder assemblies 44.

Figure 3:
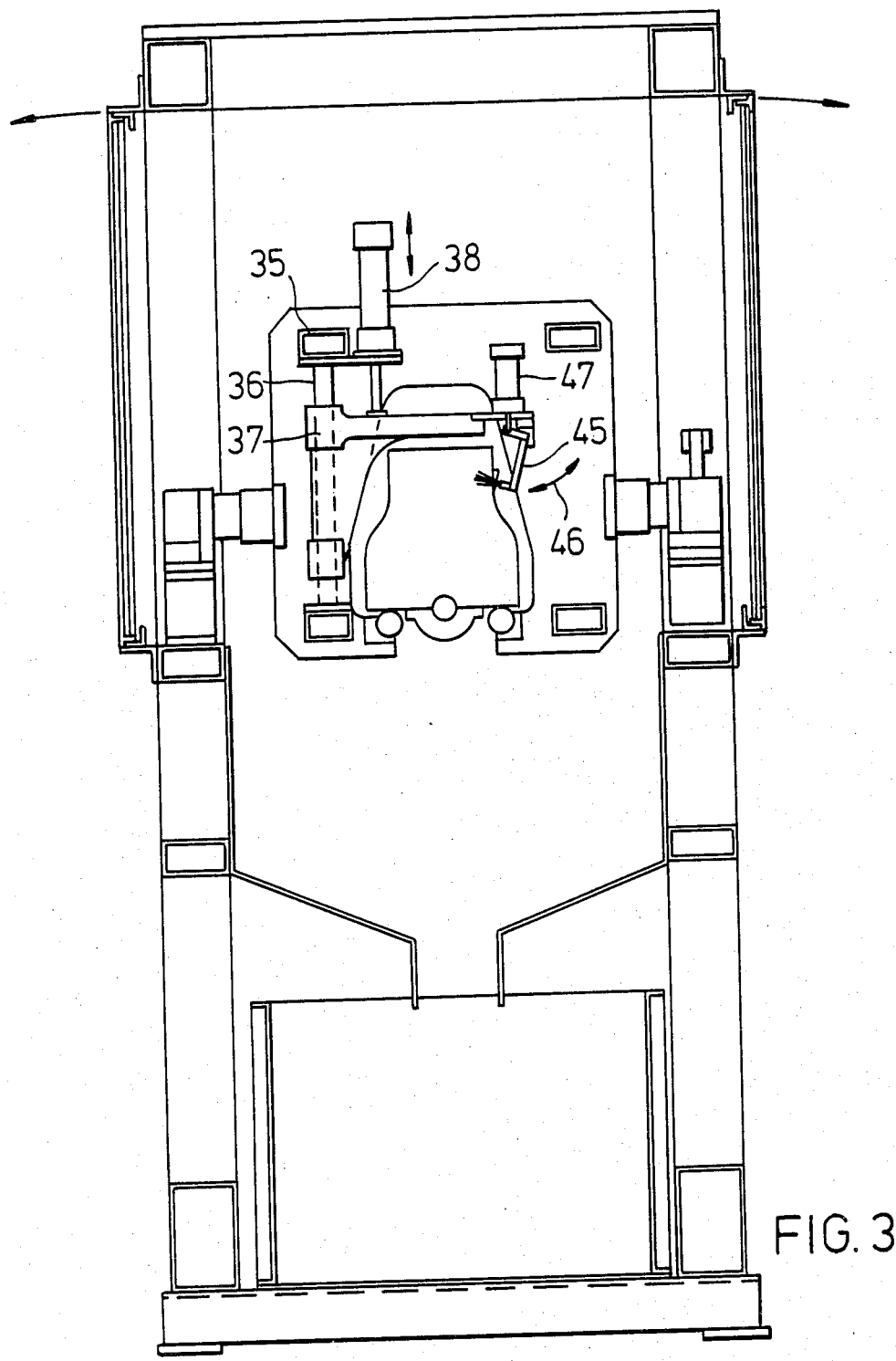
FIG. 3 is a section through the second washing station.

In addition to the high-pressure water jets 41 the second washing station 11 also includes a selective water jet 45 carried by the retaining member 37 and angularly movable in the direction of arrow 46 by means of hydraulic cylinder assembly 47 see FIG. 3.

Figure 1B:
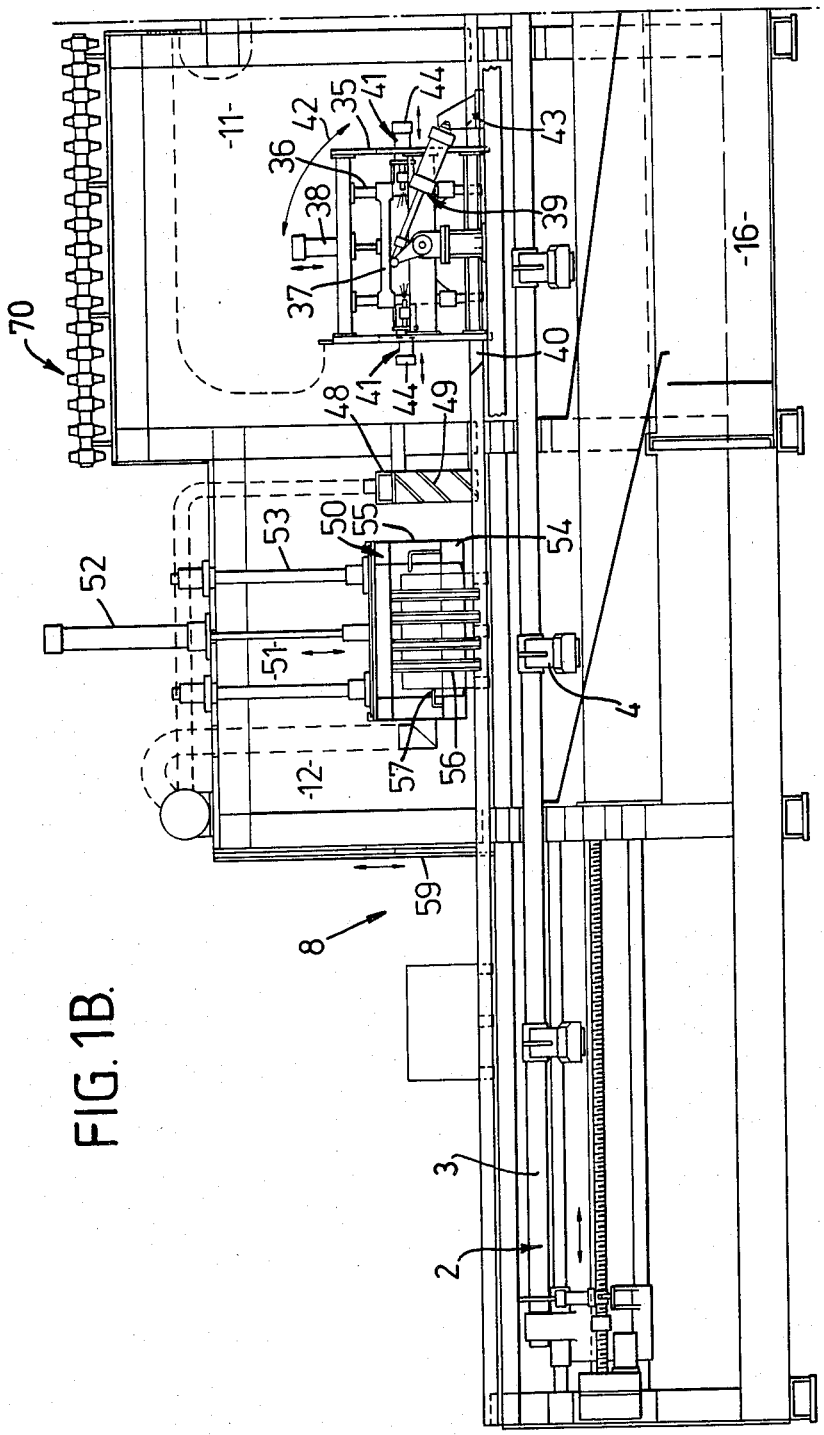

As shown diagrammatically as 70 in FIGS. 1a and 1b the cleaning apparatus includes switching control means which enables high pressure water to be switched at high pressure either from station to station or from jet position to jet position within a station, thereby making the most effective use of the power available. Further details of the switching control means are described in detail below with reference to FIGS. 8 and 9.

Having been washed at the pre-wash and first and second washing stations the component is moved by the transfer mechanism to the drying station 12.

The drying station 12 is an air-knife drying apparatus and includes an upstream 48, where slits 49 in the side arms wipe the sides of the block dry and a downstream, reciprocally-mounted air-knife frame 50. Having been passed through the upstream arch 48 the block is stopped beneath the frame 50 which is movable in the direction of arrow 51 by means of hydraulic cylinder assembly 52: guide bars 53 being provided similar to the arrangement in the first washing station. The frame 50 has a square hollow base 54 which passes around the outside of a block, and arch 55 which extends over the base 54, and a plurality of tubes 56 depending from the arch 55 which pass inside the cylinder bores and cooling bores of the engine block. Selective drying tubes 57 also extend from the base 54.

The base 54, tubes 56 and 57 are all provided with slits so that the respective parts being dried are wiped dry during movement of the frame 50 into and out of a particular engine block. Once a block is dry it is passed to the unloading station 8.

Although not clearly indicated the four cleaning stations are surrounded by a protective casing which may be provided with observation windows for the use by the operator. Entry and exit doors 58 and 59 are slidably mounted as indicated by their respective arrows to allow the components to be fed into, and exit from, the apparatus.

Figure 4:
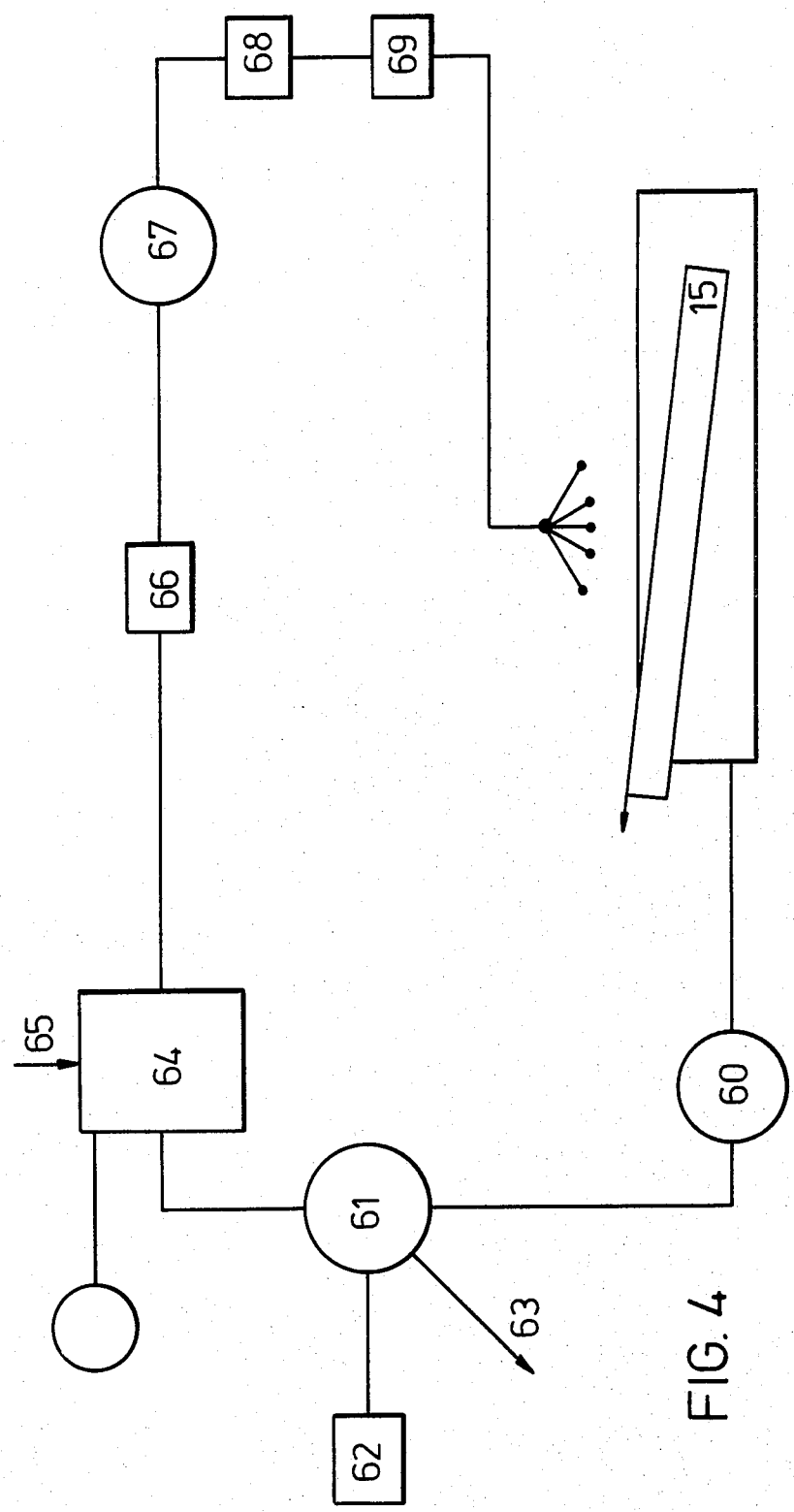
FIG. 4 is a diagram of the filtration and water cycle.

FIG. 4 illustrates diagrammatically the water cycle. Dirty water from the four cleaning stations passes, via the magnetic chute 15, to the dirty water tank 16: the magnetic chute 15 removing metallic swarf from the water. From the tank 16 the dirty water is pumped by pump 60 to a filter 61: a backwash facility as indicated 62 and a drain outlet 63 being provided for cleaning of the filter when necessary. Once filtered the recycled water is passed to a header tank 64 for re-use and this supply may be augmented by main supply 65. On demand recycled water passes through a 10 micron cartridge filter 66 to a high pressure pump 67 which increases the pressure of the water to that desired. The water then passes through an in-line high pressure filter 68 to the high pressure fluid circuit, diagrammatically indicated, from which it is distributed to the jets as required: full details of the high pressure fluid circuit are given below with reference to FIGS. 8 and 9.

Although only a single high pressure ppump 67 is shown in FIG. 4 it may be desirable to include one pump per wash station rather than including one large pump and diverting the water to each of the stations concurrently.

Figure 5:
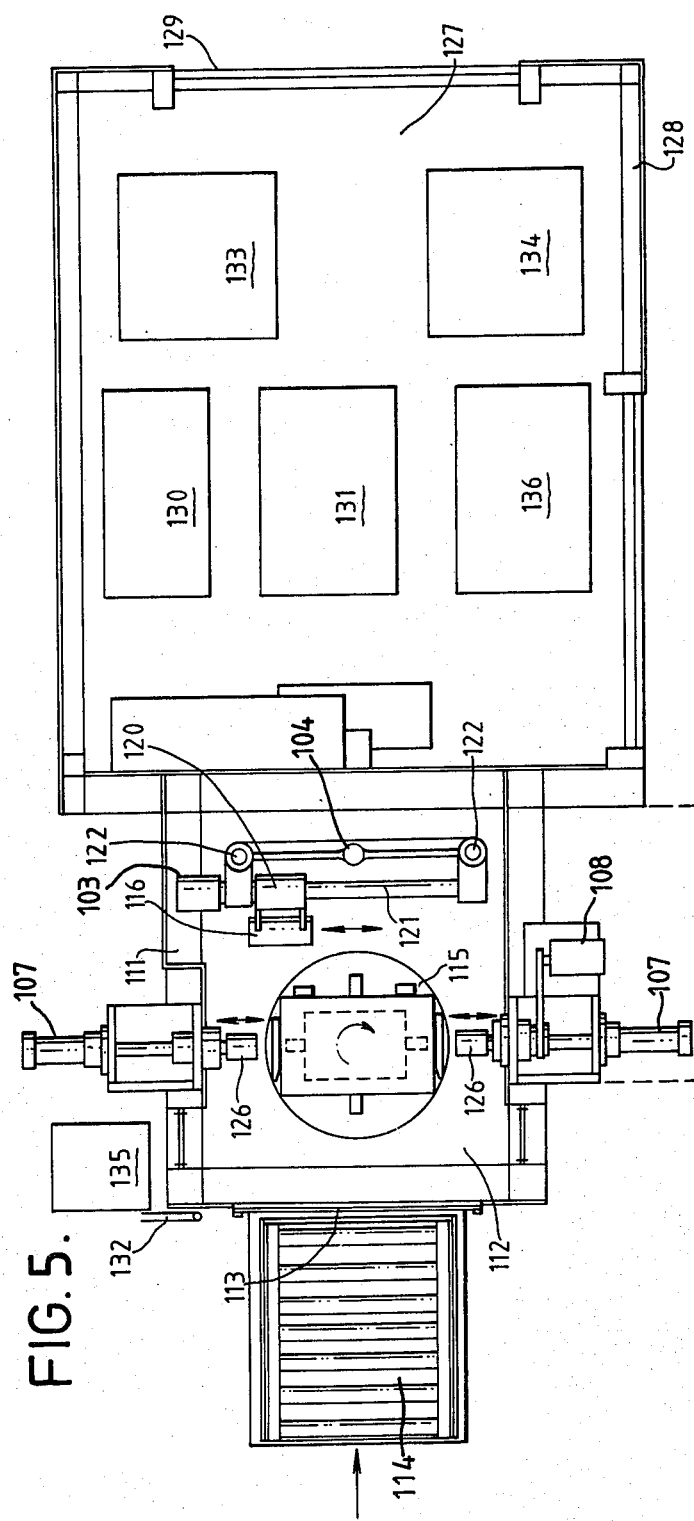
FIG. 5 is a plan view of a second embodiment of cleaning apparatus in accordance with the invention.
Figure 6:
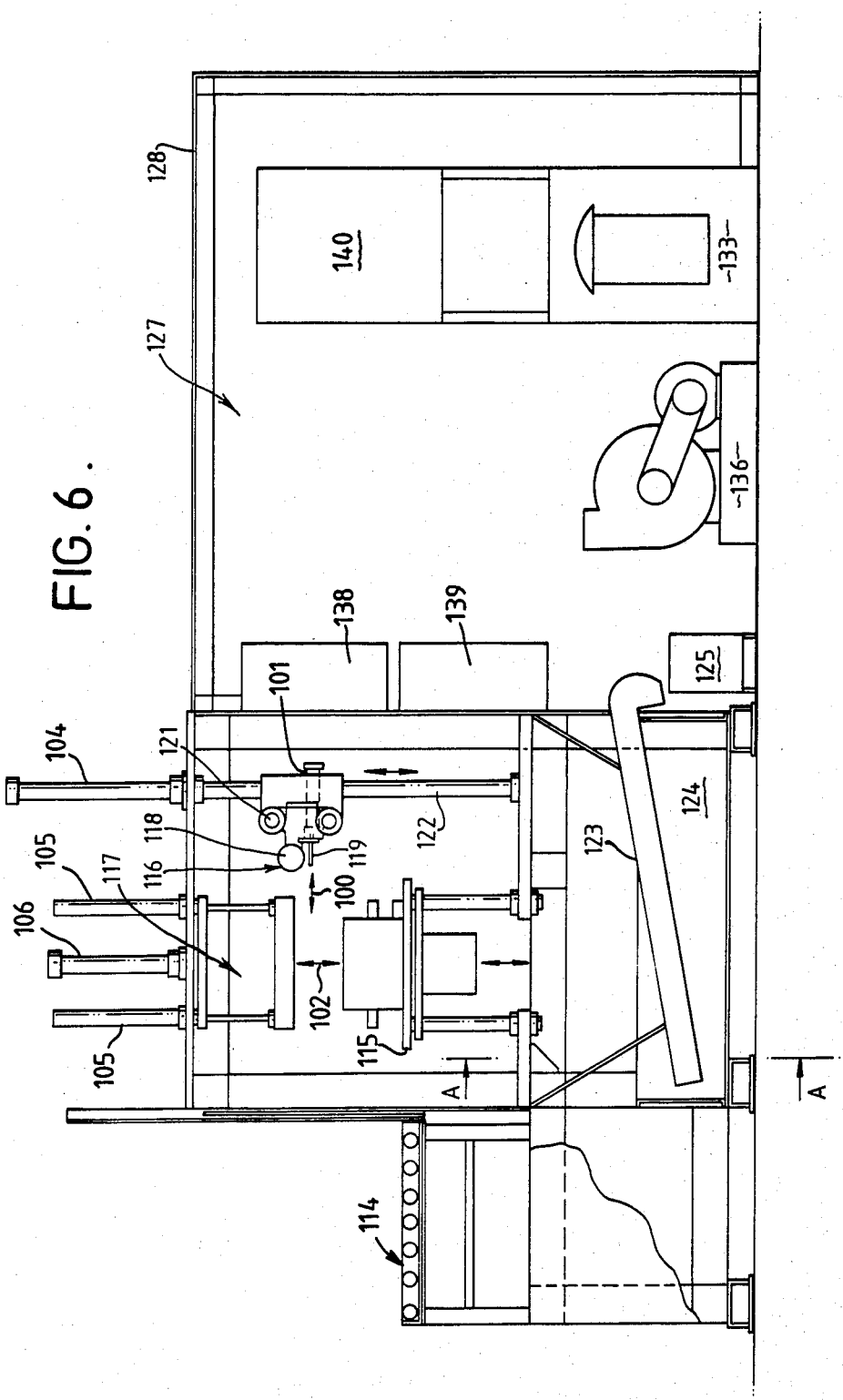
FIG. 6 is a side elevation of the apparatus shown in FIG. 5.
Figure 7:
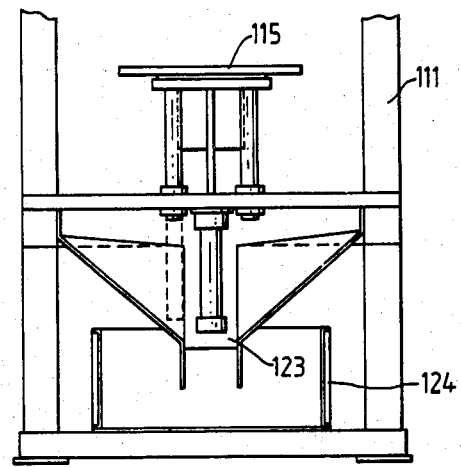
FIG. 7 is a part section on A—A in FIG. 6.

A second embodiment of cleaning apparatus is illustrated in FIGS. 5 to 7 in which a component cleaning apparatus comprises a casing 111 defining an enclosed cleaning chamber 112. A vertically slidable door 113, which is hydraulically operated, is provided in one wall and aligned with the door 113 on the outside of the apparatus is a movable roller track conveyor 114 by means of which components may be fed to, or removed from, the apparatus.

Within the cleaning chamber there is a rotatably mounted table 115 which may be indexed into a desired angular position and which receives the components to be cleaned. The cleaning elements include a washing means 116 and a drying means 117. The washing means 116 comprises a main water jet manifold 118 having a number of concentrated fan jets which will give a broad band of approximately 7" and one central cone-shaped straight jet 119 which is used for preferential washing. The washing means 116 is mounted on a carriage 120 movable along traverse bars 121 which in turn are mounted on perpendicularly arranged traverse bars 122 so that the washing means 116 may be moved on an XY axis in one plane. Movement of the carriage 120 along bars 121 being controlled by D.C. motor 103 and movement along bars 122 being controlled by hydraulic cylinder assembly 104. Moreover, as indicated by the arrow 100, the preferential washing jet 119 may be moved on a third Z axis by means of a hydraulic cylinder assembly 101.

The drying means 117 is an air knife drying manifold which is also movable on the X axis on guide bars 105 as indicated by arrow 102: the movement being effected by a double-acting hydraulic cylinder assembly 106. The air knife manifold may be supplemented by a handhold drying knife the supply for which is indicated at 132.

Disposed beneath the rotatable table 115 is a magnetic swarf conveyor 123 onto which foul water falls before being passed to the tank 124. Swarf removed by the conveyor 123 is collected in a swarf bin 125.

It will be understood that the rotatable table 115 enables four faces of a component to be aligned with the washing means 116 but, in order to accommodate for the washing of all faces, opposed trunnions 126 are provided. The trunnions are retractable by means of double-acting hydraulic cylinders 107 and one is driven through a motor 108.

Also provided on one side of the apparatus is a service area 127 panelled with removable sound deadening panels 128. The service area has an access door 129 and includes a hydraulic power unit 130, a high pressure water jetting pump and motor 131, an air blower and motor 136, a filtration system and water supply tank 133 for recycling cleaning water, and an auto back-wash supply tank 134. References 138 and 139 indicate respectively the service manifolds for the high pressure water and hydraulic cylinder assemblies and includes switching control means described in more detail below. The reference 140 represents a header tank.

The apparatus is controlled from an operator's control 135 outside the casing 111. In front of the operator is a control lever (not shown) which, when moved will operate the XY axis, and a visual display unit with a graph and a light source. The operator may also control movement of the preferential washing jet 119 on the Z axis and movement of the drying manifold. The light source moves over the screen in direct relation to the position of the jetting manifold on the XY axis. The operator then lays over the screen a transparent drawing of the component with the specific areas which need preferential cleaning clearly marked. This drawing is mounted beneath a clear glass sheet so that it is in direct contact with the screen and in this way eliminates parallax error. With the drawing in place the jetting operation can be carried out by the operator in the knowledge that he can move the jet to any position he requires and hold it in any position ensuring that total cleaning of the component is carried out.

Figure 8:
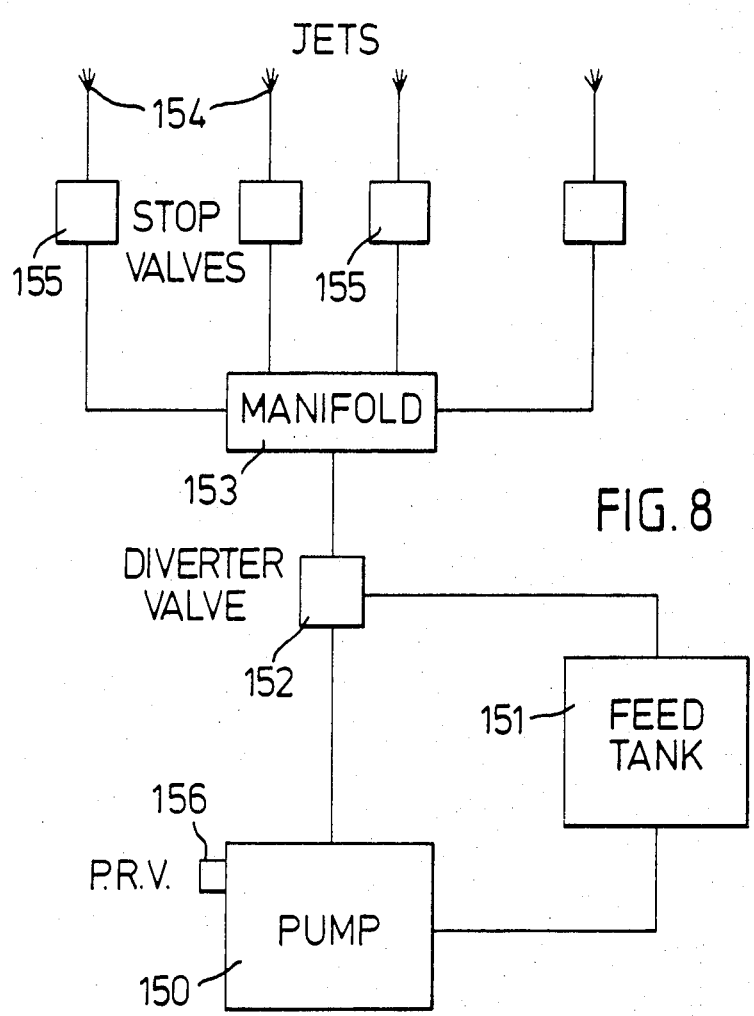
FIG. 8 is a preferred fluid circuit diagram applicable to both the first and second embodiments.

FIG. 8 illustrates the preferred fluid circuit diagram for each wash station of the multi-station cleaning apparatus of the first embodiment or the single station cleaning apparatus of the second embodiment. If the multi-station embodiment only incorporates a single pump then an additional wash station manifold will be incorporated between the manifold and diverter valve shown.

The fluid circuit shown includes a pump 150, a feed tank 151, a diverter valve 152 and a manifold 153. The pump 150 is continuously in motion whilst the machine is operating and water is fed from the feed tank 151 to the diverter valve 152. At diverter valve 152 water is either directed at very low pressure back to the feed tank 151, or when the valve 152 is actuated, water is fed at high pressure to the manifold 153. The manifold 153 is directly connected to all the jets 154 which the pump 150 is to feed and each jet is provided with a stop valve 155.

The control of the cleaning apparatus is arranged so that the diverter valve 152 cannot be actuated to switch water to the manifold 153 unless one of the stop valves 155 supplied by the manifold 153 is open. With one of these stop valves 155 open, the diverter valve is actuated and the water enters the manifold 153 and exits by the valve which is open. In order to switch the water to another jet stop valve 155 or, in the case of the single pump for the multi-station embodiment, jetting manifold, that valve is opened and the previous valve closed.

Once the predetermined washing cycle has been completed by the jetting manifolds, the diverter valve 152 is then actuated and the water is once again diverted to the feed tank 151: the last open stop valve 155 can then be closed.

Figure 9:
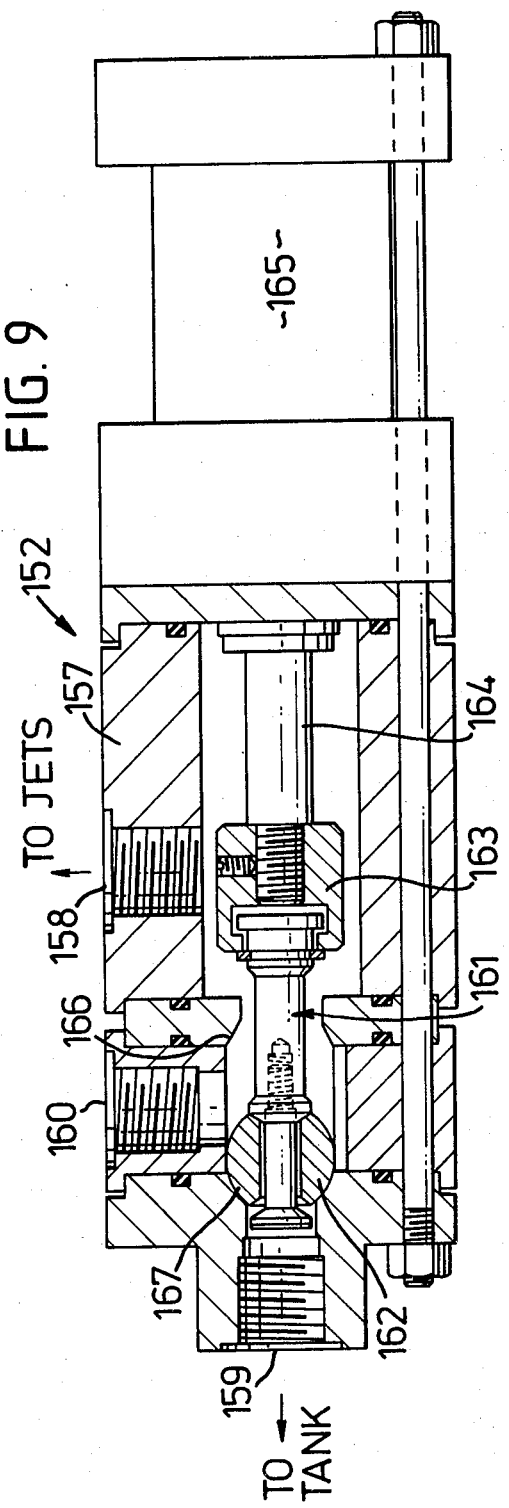
FIG. 9 is a section through the diverter valve shown diagrammatically in FIG. 8.

The diverter valve 152 is of special design and is illustrated in FIG. 9. This valve enables diversion to take place without there being a position in which both outlets are closed off as the valve switches over. If this were not the case and both outlets were closed off, if only for a fraction of a second, then the pump would be pumping into a closed circuit and the high pressure of water would cause the pump relief valve 156 to open and dump water. Ideally the relief valve 156 should not be used in this way and should only act as a back-up fail-safe should the diverter valve 152 or jet stop valve 155 fail.

The diverter valve 152 has a hollow body 157 having a first outlet 158 to the jetting manifold 153, a second outlet 159 to the feed tank 151 and an inlet 160 from the pump 150. Disposed movably within the hollow body 157 is the valve member 161 which comprises a large ball valve 162 attached by a floating coupling 163 to the actuator ram 164 of a double-acting hydraulic or pneumatic piston and cylinder assembly 165. The ball valve 162 seats on either of two annular seatings 166, 167 so that water from the inlet 160 is either provided at low pressure to the tank 151 through outlet 159, or at high pressure to the jets 154 through outlet 158. During the change over period, water from the inlet 160 is free to travel to either the feed tank 151 or the jets 154, in fact the water will always take the line of least resistance and temporarily return to the feed tank 151.

The floating coupling 163 means that no precision is needed to line up the actuator ram 164 accurately with the valve seatings 166, 167 as the ball valve 162 will always find its own setting on the seat. The ball valve 162 will either be stainless steel or plastics material and the seatings 166, 167 will be knife-edge chamferred and either stainless steel or ceramic material.

The stop valves 154 may be hydraulically operated and suitably of the same design as the diverter valve shown in FIG. 9 except that the outlet 159 to the feed tank would be blocked off. Alternatively, other conventional valves may be used. The stop valves 154 and diverter valve 152 may be operated manually if desired but preferably, as disclosed, the valves are opened and closed in a predetermined sequence by switch means generally indicated 70 in FIGS. 1a and 1b and included in the service manifolds 138 and 139 in FIG. 6.

In operation, for example for washing an engine manifold block, the manifold block is placed on the conveyor 144 at the front of the machine and two spindles inserted by the operator on two opposing faces. The door 113 of the machine is opened, and machine being inoperative while the door is open, and the manifold block is then rolled forward on to the indexing table 115 located against a fixed datum point and clamped in position. The conveyor 114 is then withdrawn by the operator and the door closed. With the door in the closed position it is then locked and the process can commence.

The operator is seated at a control panel 135 from where he may control the movement of the washing means 6 by reference to the light dot on the visual display unit. A transparent drawing is then superimposed by the operator on the display unit which will show the various locations of the areas on the relevant face of the manifold which require preferential cleaning.

The washing means 116 which comprises the concentrated fan jets 118 and the one central one-shaped straight jet 119 is then operated, the operator selecting either the broad band cleaning or the preferential jet: the switching working as described above. Normally he will select the broad band cleaning and will make a number of general passes over the face of the component which will ensure general overall cleanliness. Then, if there are preferential areas to be cleaned on a particular face he will select the cone jet 119 and, by lining up the light source on the display screen with the superimposed transparency, clean these areas as required, moving the jet 119 on the Z-axis if necessary by means of actuating hydraulic assembly 101.

Having cleaned one face, the indexing table 114 on which the component is clamped can be rotated by the operator through 90° and the process repeated.

When the four faces have been cleaned in this way the indexing table 115 can then be lowered so that the two spindles, previously fixed to the component, can be locked on to the trunnion blocks 126 enabling the operator to rotate the work-piece in the other plane and thereby clean the other faces.

When cleaning has been completed the damp air within the chamber 112 is evacuated by a high volume ventilation fan and the air knife 117 can then be used to effect drying of the manifold block, the air knife being passed over the height of the manifold block by reciprocation of the hydraulic assembly 106.

The operator can now switch off the machine and open the main door, withdrawing the manifold block to the front of the machine where a hand-held air knife is available for him to use to dry the more inaccessible areas totally, such as deep drillings where some water may remain.

Although this embodiment of the invention has been particularly described as a manually-controlled operation it will be understood that the cleaning process can be 'learnt' by the machine and having learnt the process from the operator the machine can continue automatically until it is reprogrammed. It can also be programmed to interface with numerical control systems.

Control of the system may be by solid state, programmable logic control systems or numerical control. Preferably in the filtration system 133 the foul water is drawn through a high rate sand filter and thence back to the storage tanks.

In some machines where the interface between the numerical control system which a company may have already installed and the programmable logic control system in the machine are incompatible then the control system of the XY axis will be as follows: the operator will have an XY axis plan drawn up in front of him on a digitiser and equipped with a cursor which will follow the required path for the manifold and which will feed the information to a processor which, in this instance, can be interfaced with the control systems already in operation.

The pressure of the water at the washing stations may be as high as 10,000 psi or more in which case the water volume could be as little as 5 gallons per minute depending upon the horse power of the pump being used. Also, as the pressure of the high pressure water is partly a function of the number of jets being used and therefore far less jets the water pressure may be less e.g.: 3,000–3,500 psi whilst using the same quantity of water. Thus a component is washed very quickly and effectively, and only a small quantity of dirty water per component is produced. Preferably water alone is used but in some cases it may be desirable to add a detergent or other additive.

The air used in the air knife apparatus may be at low pressure e.g.: 2½ psi and high volume e.g.: 1000 cubic feet per minute. The air in the air-knife drying apparatus may be at normal temperature e.g.: about 30° C. above ambient after high volume pumping may be heated e.g.: to about 100° C.

The incorporation of value means in the fluid circuit means that the volume of water consumed can be kept to a minimum. The volume from a pump is always constant and the jets are sized to achieve the maximum pressure available in relation to the output of the pump.

By switching the water about from manifold to manifold and from jet to jet the high pressure can be maintained without having to have a large pump. Thus the water consumed is less making recycling simpler and power is saved.

Although the invention has been particularly described with reference to the cleaning of engine blocks, it is understood that the cleaning apparatus of the present invention may be used for any component being washed. Moreover, although air knife drying is preferred other forms of drying may be used if desired.

What I claim as my invention and desire to secure by Letters Patent of the United States is:

1. A Cleaning apparatus for cleaning components such as vehicle engine blocks, said apparatus comprising a cleaning chamber, support means for supporting a component within the cleaning chamber during cleaning, pump means, a water manifold in said cleaning chamber for receiving water from said pump means at a pressure in excess of 1000 psi, said water manifold being mounted for movement relative to the support means for washing the component with a flow rate of water less than 200 gallons per minute at said pressure in excess of 1000 psi, said water manifold including a main washing head of a plurality of jets and at least one selective washing head movable relative to the main washing head and the component to effect selective washing of the component, valve means associated with each of the washing heads and operable on actuation to open or close the supply of water to the respective washing heads whereby the application of the water via the washing heads can be controlled, recycling means for dirty water produced by washing the component, said recycling means including means for collecting the dirty water, filter means for filtering the dirty water for re-use and a storage tank for recycled water, diverter valve means between the pump means and the water manifold, said diverter valve means having an inlet and first and second outlets whereby, in a first position, it supplies water at said pressure in excess of 1000 psi to the water manifold on demand and, in a second position, it returns the water to the storage reservoir, and means for drying the components.

2. A cleaning apparatus according to claim 1 wherein the high pressure water is at a pressure of between 3000 and 7000 psi.

3. A cleaning apparatus according to claim 1 wherein the flow rate of water consumed is in the range of 10 to 40 gallons per minute for each pump forming said pump means.

4. A cleaning apparatus according to claim 3 wherein the volume of water consumed is in the range of 15 to 25 gallons per minute.

5. A cleaning apparatus according to claim 1 wherein the valve means associated with each of the washing heads comprises a fluid operated valve selectively actuated by switch means.

6. A cleaning apparatus according to claim 1 wherein the diverter valve means comprises a hollow body, an inlet to the body for water from the pump means, an outlet from the body to the storage reservoir, an outlet from the body to the water manifold, a ball valve member movable within the body between first and second seatings on the body whereby the inlet is always in fluid communication with one of said outlets, a fluid-operated actuator for moving the ball valve member between the first and second seatings, and a floating coupling between the ball valve member and the fluid-operated actuator so that the ball valve member may position itself accurately upon the first or the second seating.

7. A cleaning apparatus for cleaning components such as vehicle engine blocks, said apparatus comprising a cleaning chamber including a washing station and a separate, spaced drying station, support means extending between the washing station and the drying station for supporting a component within the cleaning chamber during cleaning, said support means defining a component path, transfer means for transferring a component from the washing station to the drying station along said component path, pump means, a water manifold at said washing station for receiving water from said pump means at a pressure in excess of 1000 psi, said water manifold being reciprocably mounted for movement relative to the component path for washing the component with a flow rate of water less than 200 gallons per minute at said pressure, said water manifold including a main washing head of a plurality of jets for washing of particular parts of a component and at least one selective washing head movable relative to the main washing head and the component to effect selective washing of the component, each of the said washing heads including valve means operable on actuation to open or close the respective washing head whereby the application of the water via the washing heads can be controlled recycling means for the dirty water produced by washing the component, said recycling means including means for collecting the dirty water and filter means for filtering the dirty water for re-use effective to remove substantially all particles of a size greater than 10 microns, and a drying manifold at said drying station for drying the component with a high volume of air, the drying manifold being reciprocably mounted for movement into and out of the component path to effect complete drying of the component.

8. A cleaning apparatus according to claim 7 wherein, the washing station comprises two stages, a first stage including the high pressure water manifold and the second washing stage comprising a frame arranged to engage the component and to rotate the component through a predetermined angle relative to a plurality of fixed high pressure water jets for general washing of the component, and the pump means includes a main water manifold which supplies the high pressure water manifold of the first stage and the high pressure of the second stage.

9. A cleaning apparatus according to claim 8 wherein a diverter valve means is positioned between the pump means and the main water manifold, said diverter valve comprising a hollow body, an inlet to the body for water from the pump means, an outlet from the body to the storage reservoir, an outlet from the body to the water manifold, a ball valve member movable within the body between first and second seatings on the body whereby the inlet is always in fluid communication with one of said outlets, a fluid-operated actuator for moving the ball valve member between the first and second seatings, and a floating coupling between the ball valve member and the fluid-operated actuator so that the ball valve member may position itself accurately upon the first or the second seating.

10. A cleaning apparatus according to claim 7 wherein the drying station comprises two stages, a first stage including an upstream, air knife, drying arch and a second stage including the manifold, said manifold including means for selective drying of particular parts of a component.

11. A cleaning apparatus for cleaning components such as vehicle engine blocks, said apparatus comprising a cleaning chamber, support means for supporting a component within the cleaning chamber during cleaning, means for washing the component with a flow rate of water less than 200 gallons per minute at a pressure above 1000 psi, said washing means including: pump means, a water manifold for receiving water at said pressure from the pump means, a main washing head and a selective washing head in fluid communication with the water manifold, means for moving the washing means relative to the component in at least one direction, means for moving the selective washing head relative to the main washing head in a direction transverse to said one direction and relative to the component to effect selective washing of the component, and valve means associated with each of the washing heads and operable on actuation to open or close the supply of water to the respective washing heads whereby the application of the water via the washing heads can be controlled: recycling means for the dirty water produced by washing the component, said recycling means including means for collecting the dirty water and filter means for filtering the dirty water for re-use effective to remove substantially all particles of a size greater than 10 microns, means for drying components with a high volume of air, means for moving the drying means relative to the component to effect complete drying of the component, said support means for receiving the component being arranged to change the position of the component during washing so as to present different sides of the component to the washing means, both the washing means and the component being movable relative to one another so as to effect a total cleaning of the component, and said washing means being mounted on a carriage movable in two perpendicular directions so that the washing means is movable relative to the component in a single plane.

12. A cleaning apparatus according to claim 1 wherein the selective washing head is movable in a direction perpendicular to either of the two directions in which the carriage is movable.

13. A cleaning apparatus according to claim 7 wherein the high pressure water is at a pressure above 3000 psi and below 10,000 psi.

14. A cleaning apparatus according to claim 1 wherein the washing and drying are effected at the same station.

* * * * *